C. A. GRICE.
MACHINE FOR FINISHING STONE AND THE LIKE.
APPLICATION FILED MAY 21, 1913.

1,180,260. Patented Apr. 18, 1916.
8 SHEETS—SHEET 2.

WITNESSES:
Howard R. King
Mildred E. Brook

INVENTOR:
Charles A. Grice,
BY
Russell M. Everett
ATTORNEY.

C. A. GRICE.
MACHINE FOR FINISHING STONE AND THE LIKE.
APPLICATION FILED MAY 21, 1913.

1,180,260.  Patented Apr. 18, 1916.
8 SHEETS—SHEET 3.

WITNESSES:
Howard M. King
Mildred E. Brooks

INVENTOR:
Charles A. Grice,
BY
Russell M. Everett
ATTORNEY.

C. A. GRICE.
MACHINE FOR FINISHING STONE AND THE LIKE.
APPLICATION FILED MAY 21, 1913.

1,180,260.

Patented Apr. 18, 1916.
8 SHEETS—SHEET 5.

WITNESSES:
Howard R. King
Mildred E. Brooks

INVENTOR:
Charles A. Grice,
BY
Russell M. Everett,
ATTORNEY.

C. A. GRICE.
MACHINE FOR FINISHING STONE AND THE LIKE.
APPLICATION FILED MAY 21, 1913.

1,180,260.  Patented Apr. 18, 1916.
8 SHEETS—SHEET 8.

WITNESSES:
Howard R. King
Mildred E. Brooks

INVENTOR:
Charles A. Grice,
BY
Russell M. Everett,
ATTORNEY.

UNITED STATES PATENT OFFICE.

CHARLES A. GRICE, OF ALLWOOD, NEW JERSEY, ASSIGNOR, BY MESNE ASSIGNMENTS, TO WALTER M. VAN DEUSEN, OF NEWARK, NEW JERSEY.

MACHINE FOR FINISHING STONE AND THE LIKE.

1,180,260.   Specification of Letters Patent.   Patented Apr. 18, 1916.

Application filed May 21, 1913. Serial No. 768,956.

*To all whom it may concern:*

Be it known that I, CHARLES A. GRICE, a subject of the Kingdom of Great Britain, residing at Allwood, in the county of Passaic and State of New Jersey, have invented certain Improvements in Machines for Finishing Stone and the like, of which the following is a specification.

The objects of this invention are to provide a machine for rubbing, honing and polishing the surface of marble, granite and other kinds of stone or similar material, as is necessary for preparing the same to be used in building or the like, particularly for interior work, and which has heretofore been done by hand to greater or less extent; to provide an automatic machine for doing this work, so that the results will be uniform and quickly obtained; to provide in such a machine rotating rubbers which also shift laterally so as to prevent lining or ridging the marble or other material being worked, and to enable the amount of such shifting to be adjusted; to provide resiliency in the rubber or supporting means therefor, so that the rubber can rise onto unevennesses in the surface to be rubbed, honed or polished; to enable different kinds of rubbers to be interchanged for different materials or for different purposes, such as roughing down to size, finishing or polishing, and to enable such interchange to be made quickly and easily; to provide suitable means for supporting and driving the rubbers, which also admit of their being raised and lowered, either to work at different heights or to apply and remove them on a given piece of work; to secure means for lubricating the supporting means of said rubbers, and for supplying water to the rubbers themselves; to provide alternating tables arranged end to end, so that one may be feeding a piece of work to the rubbers while the other is being loaded; to provide suitable means for operating said tables or a single table, and to obtain other advantages and results as may be brought out in the following description.

Referring to the accompanying drawings in which like numerals of reference indicate the same parts throughout the several figures, Figure 1 is a side elevation of a machine embodying my invention.

Briefly describing my invention as shown in said drawings, to give a general idea of the same, I provide two tables 1, 2 arranged end to end upon a horizontal slideway formed by tracks 3, 3 on a bed or base 4, said tables being adapted to carry marble or other work it may be desired to treat or polish. Intermediate of the ends of said tracks 3, 3 are two upright stanchions 5, 6 upon opposite sides of the path of the tables and secured to the base 4, and these stanchions 5, 6 support a cross-beam 7 above the track, see Fig. 2, which is adjustable vertically as will be hereinafter more fully described. Upon this cross-beam is a carriage 8 inclosing the same like a sleeve and having a limited sliding motion longitudinally thereof, said carriage providing at its opposite upright sides spindles 9, 9 arranged in staggered relation to each other and adapted to be rotated all in the same direction. The lower ends of these spindles receive rubbers 10 depending from the carriage 8 and adapted to engage the surface of a piece of stone or the like upon one of the tables 1, 2. Said rubbers are rotated all in the same direction by the spindles 9 and are movable up and down with respect thereto for engaging them with or disengaging them from a piece of work, suitable means being provided for so raising and lowering them. Means are also provided for reciprocating the tables 1, 2, to carry the work beneath the said rubbers, as will be hereinafter described in detail, and there are connections for driving the various parts of the mechanism from a common source of power.

Figures 1, 23:
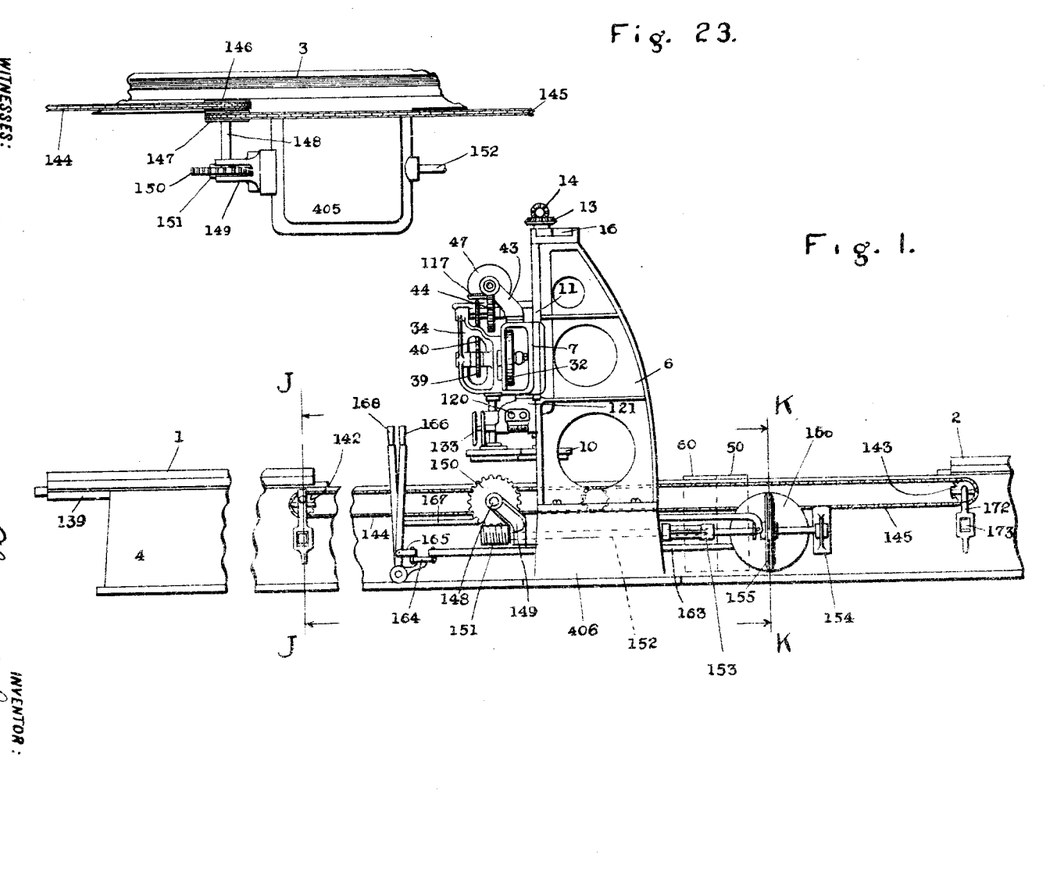
Figure 2:
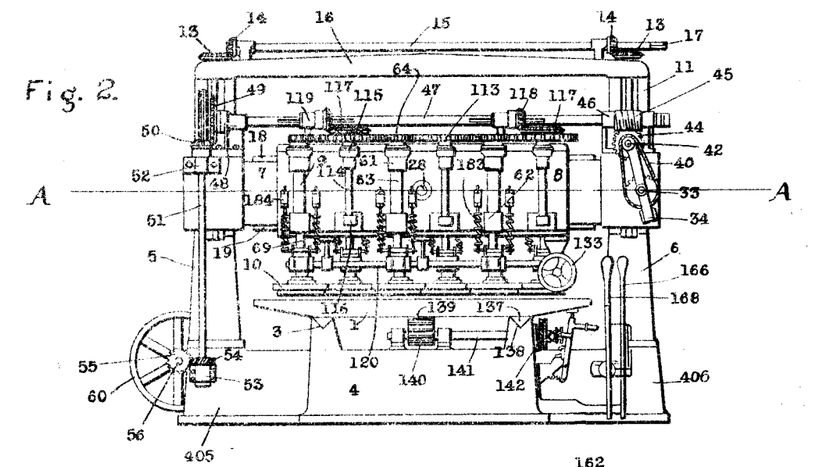
Fig. 2 is an elevation of the end of the same which is at the left-hand in Fig. 1.
Figure 3:
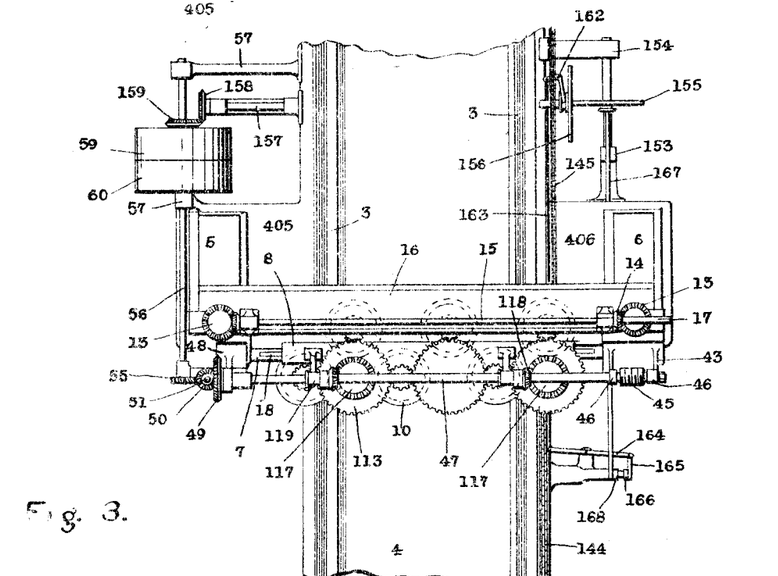
Fig. 3 is a plan of the middle portion of the machine.

Describing the invention more in detail, and referring to Figs. 1, 2 and 3 more especially, the stanchions 5, 6 provide vertical slideways 11 upon which the cross-beam 7 can be moved up and down by screw-shafts 12, 12 in said stanchions to secure an approximate adjustment of the rubbers with respect to a given piece of work. Beveled gears 13, 13 on the upper ends of these screw-shafts are engaged by other beveled gears 14, 14 upon a horizontal shaft 15 mounted on the top leaf 16 of the stanchions and adapted at one end, as 17, to receive a wrench or crank to rotate the screw-shafts in unison and raise or lower the cross-beam 7 and parts carried thereby. It will be understood that this adjustment is used only when changing to work of radically different height, and obviously the shaft 15 may be connected to and turned by power, if desired.

The cross-beam 7 is preferably hollow and several times as high as it is thick so as to secure rigidity against bending downward, and upon its upper and lower edges are tracks 18, 19, respectively, for the sleeve-like carriage 8 which incloses the cross-beam 7 intermediate its ends. This carriage is composed of opposite upright sections 20, 21, fitted and bolted together at their upper and lower edges, as at 22, 22, see Fig. 3, and preferably the sections 20, 21 have adjacent to each line of connection interior shoulders 23, 24 which form between themselves a slideway for one of the tracks 18 or 19. One of said shoulders, as 24, is preferably formed by a shoe 25 having a tongue 26 seated in a groove of the section 21, said shoe adapted to be adjusted toward the track to take up looseness, as by adjusting screws 27.

Figure 4:
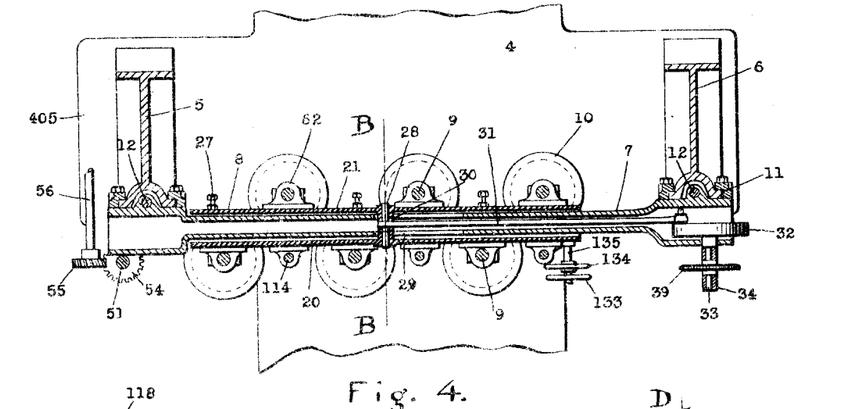
Fig. 4 is a sectional plan taken on line A—A of Fig. 2.
Figures 5, 6, 7, 8:
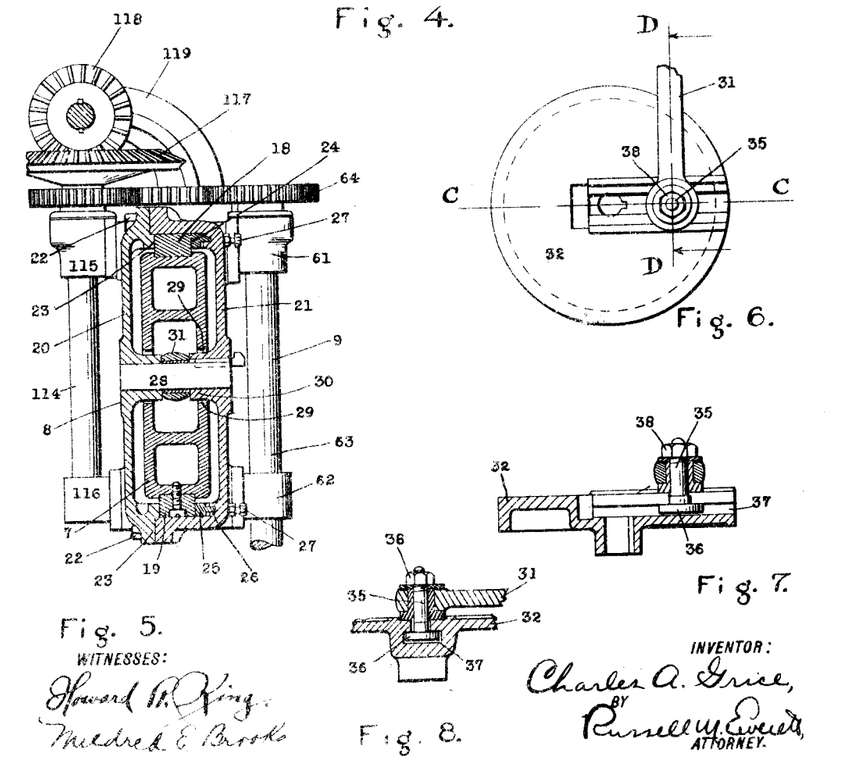
Fig. 5 is a sectional view through the cross-head taken on line B—B of Fig. 4.
Fig. 6 is a detail side view of a crank disk for reciprocating the carriage on the cross-head.
Figs. 7 and 8 are sections of the same on lines C—C and D—D, respectively, of Fig. 6.
Figure 9:
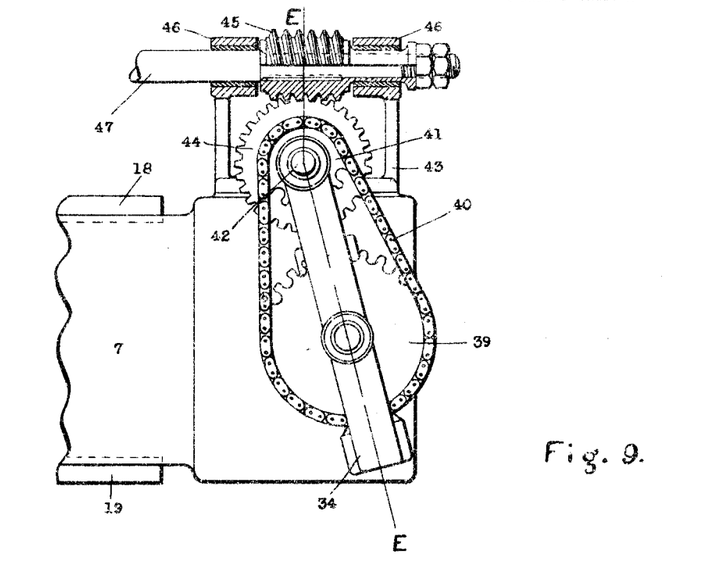
Fig. 9 is an elevation of the right-hand end portion of the cross-head, as seen in Fig. 2, on larger scale.
Figure 10:
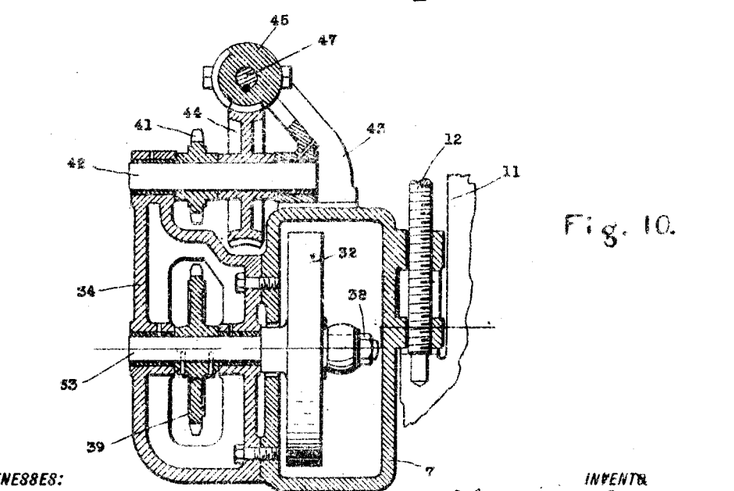
Fig. 10 is a sectional view on line E—E of Fig. 9.

At about its middle, the said carriage 8 has a transverse pin 28 extending through a longitudinal slot 29 in the cross-beam 7, and preferably said pin is mounted in hubs 30 of the carriage sections which project inwardly into said slot 29 also, so as to secure better bearings for the pin. Said pin 28 pivotally receives one end of a connecting rod 31 which extends longitudinally through the hollow cross-beam 7 to one end thereof, where it is secured to the pin of a crank disk 32 also within the cross-beam, as shown in Fig. 4, and mounted in a vertical plane transverse of the machine upon a shaft 33 journaled in a bracket 34 bolted to the side of the cross-beam 7, opposite the stanchion 6, as shown in Figs. 9 and 10. Obviously, as the shaft 33 is rotated to turn the crank disk 32 the carriage 8 will be reciprocated upon the cross-beam 7. Preferably the range of such reciprocation can be varied, to better adapt the machine to different kinds of work, and I have shown such variation rendered possible by giving the crank pin 35, see Figs. 6, 7 and 8, a head 36 which is slidable in a radial T-slot 37 in the face of the crank-disk 32, a nut 38 at the outer end of the pin enabling it to be clamped in any desired position by any suitable and well-known arrangement of intermediate parts.

A sprocket wheel 39 on the crank disk shaft 33, see Figs. 2, 9 and 10, is connected by a chain 40 to another sprocket wheel 41 on an upper counter shaft 42 mounted in the bracket 34 and another bracket 43 on the top of the crossbeam 7, and carrying also a worm wheel 44. This worm wheel meshes with a worm 45 arranged between bearings 46, 46 of said bracket 43 upon a shaft 47 which extends horizontally parallel to the cross-beam 7 and carriage 8 a little above the same and is mounted at its end opposite the end just described in a bracket 48 upon the end of the cross-beam 7, see Figs. 2 and 3. Beyond this bracket 48 the shaft 47 has a bevel gear 49 meshing with a bevel gear 50 which is slidably arranged next to the cross-beam 7 upon a vertical shaft 51 having a bearing 52 upon the side of the cross-beam 7 and a lower bearing 53 upon the bed or base 4 of the machine or lateral extension 4b thereof which supports the stanchion 5. Just above said lower bearing 53 the vertical shaft 51 carries a gear 54 meshing with another gear 55 fast on a horizontal driving shaft 56 which is journaled longitudinally of the machine on the extension 4b and in a bracket 57 projecting from the base 4. Fast and loose belt pulleys 59, 60 are shown upon this shaft 56, see Figs. 2 and 3 more especially, and thus power can be applied to reciprocate the carriage 8 as before stated.

Figures 11, 12, 13:
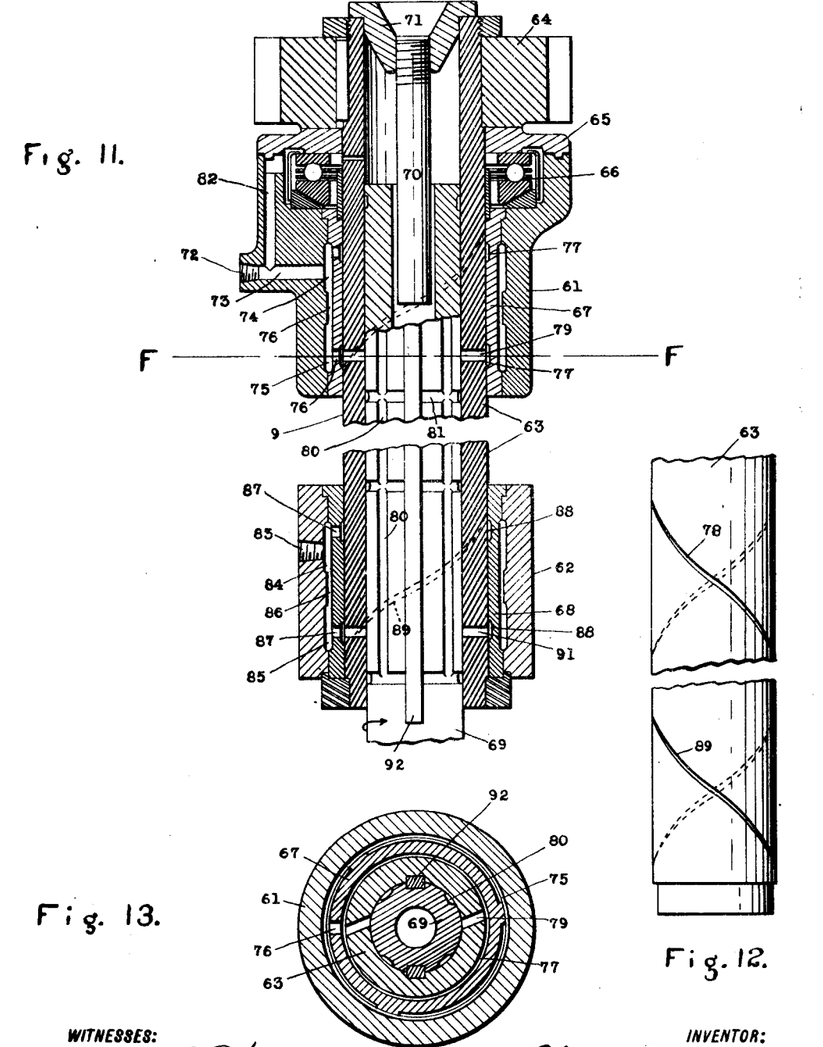
Fig. 11 is a central longitudinal section through the upper portion of one of the spindles for carrying the rubbers and mounting therefor.
Fig. 12 is an elevation of the spindle removed from the bearings and partly broken away.
Fig. 13 is a cross-section taken on line F—F of Fig. 11.

The carriage 8 has at its opposite upright sides, see Figs. 2, 3, 4 and 5, series of upper and lower bearings 61, 62, respectively, each of which pairs rotatably supports a spindle 63 adapted to carry one of the rubbers 10. Said spindle, which is shown in detail in Fig. 11, is tubular and provided at its upper end with a gear wheel 64 fast to the spindle. This gear wheel 64 rests upon a cap 65 for the bearing 61, which cap in turn rests upon ball-bearings 66 suitably arranged in the bearing 61 or upper recess thereof. A bushing 67 extends from said ball-bearing 66 downward through the bearing 61 between it and the spindle 63. The lower bearing 62 similarly has a bushing 68 arranged between itself and the spindle, as shown. Within the said tubular spindle 63 is the stem 69 of a rubber 10, said stem being also hollow and receiving at its upper end a water supply tube 70, which is provided at its top with a funnel-like bushing 71 adapted to seat loosely in the upper end of the spindle. Water may be supplied to these funnels 71 of the various spindles by any system of piping suitable to the purpose and which I have not shown since it is no part of my invention.

In order to lubricate the upper bearings 61, each is adapted to receive an oil pipe as at 72 in Fig. 11, from which point a duct 73 leads radially inward to an annular space 74 between the bearing and its bushing 67, there being also a lower annular recess 75 of similar nature and connected to the upper one by vertical passages 76 as may be necessary to allow the oil to pass to said lower recess 75. From each annular recess a passage 76 extends radially through the bushing 67 and opens into an annular recess 77 contiguous to the spindle 63. The outer surface of the spindle 63 is provided with spiral grooves 78 each extending preferably about 180° around the spindle and being inclined rearwardly upward with respect to the direction of turning of the spindle, the ends of said grooves extending to the upper and lower annular recesses 77, 77, so that as the spindle rotates said grooves will carry some of the oil which tends to collect by gravity in the lower part of the bearing upward to the upper part of the bearing. Furthermore, the spindle has passages 79 through its walls at the level of the lower annular recess 77 which are inclined rearwardly inward, oblique to radial lines, as shown in Fig. 13, and these passages are adapted to conduct oil to the stem 69 of the rubber. Said stem is suitably grooved both longitudinally as at 80 and circumferentially as at 81 to hold the oil so fed to it, and thus the stem is lubricated as it slides up and down in the spindle. A vertical duct 82 extending upward from the oil duct 74 of the upper bearing is adapted to conduct lubricant to the ball-bearing 66, as shown in Fig. 11.

The lower spindle bearing 62 has means for lubrication similar to the upper bearing, consisting of a threaded pipe seat 83 which opens directly into the upper annular recess 84 connected to the lower one 85 by passages 86. It has also radial ducts 87 leading from said annular recesses 84, 85 to inner annular recesses 88, and the spindle has spiral grooves 89 and passages 91 to the stem 69 as in the upper bearing.

Figures 14, 15, 16:
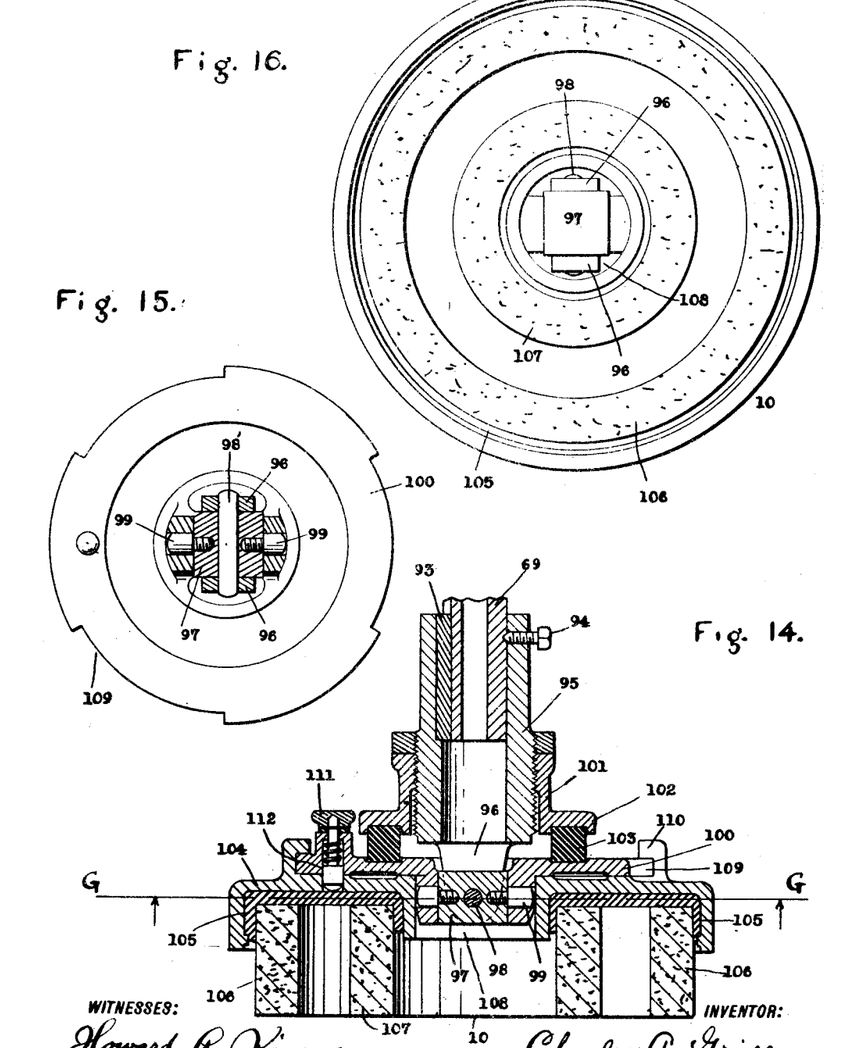
Fig. 14 is a longitudinal section through one of the rubbers and the lower end of its supporting spindle.
Fig. 15 is a sectional view on line G—G of Fig. 14, looking upward and with the rubber removed.
Fig. 16 is an underneath view of the rubber.
Figures 17, 18, 19, 20:
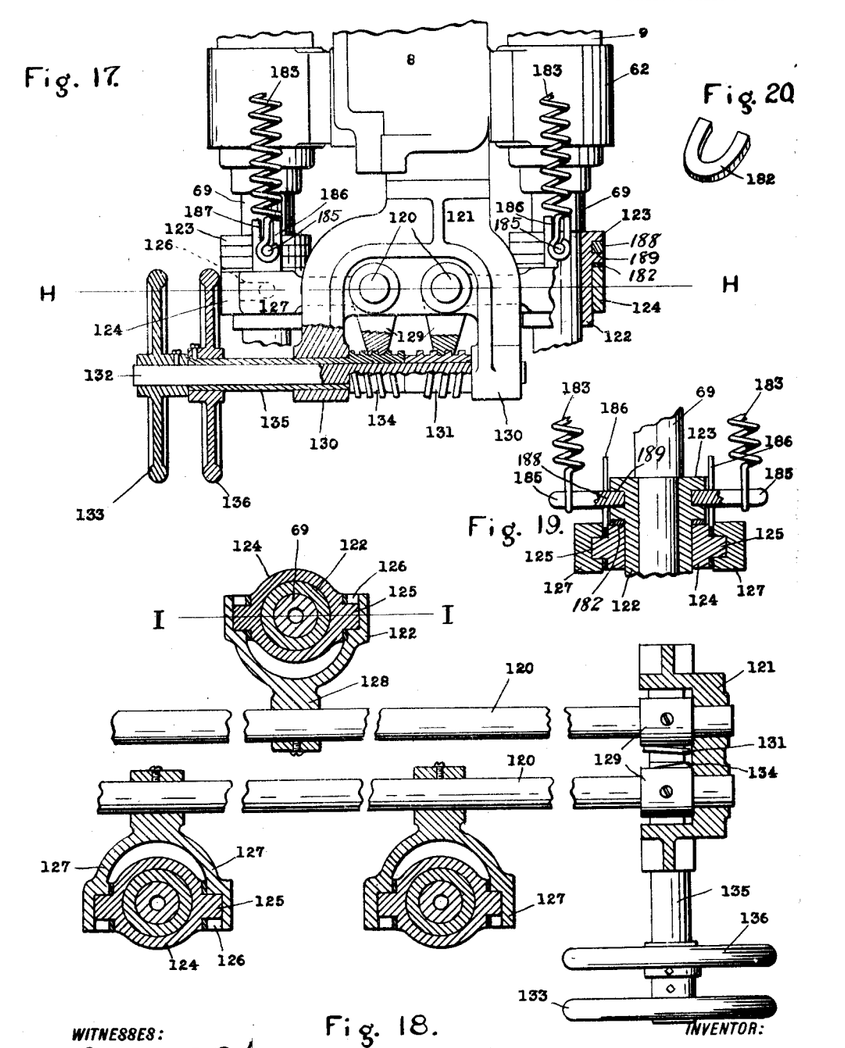
Fig. 17 is a detail elevation taken from the side of the machine shown in Fig. 1, illustrating the means on the carriage for raising and lowering the rubbers with respect thereto, certain parts being sectioned for greater clearness.
Fig. 18 is a section taken through the same on line H—H of Fig. 17.
Fig. 19 is a detail sectional view on line I—I Fig. 18, illustrating the attachment of certain springs for partially sustaining the weight of a rubber.
Fig. 20 shows in perspective a block for raising one of the rubbers into idle position independent of the others.

The stem 69 is keyed to the spindle 63 preferably by long splines 92 at opposite points, so that although said stem can slide freely up and down the rubber always turns with the spindle. Referring now more especially to Figs. 16, 17 and 18, the stem 69 of the rubber carries fast to its lower end as by the key 93 and set screw 94 a sleeve 95 which provides at its end, beyond the end of the stem opposite depending ears 96, 96 which are substantially parallel to each other and receive between themselves a block 97 which is hinged by a pin 98 passed transversely through said block and ears. At right angles to each pin and in the same transverse plane, said joint block 97 has trunnions 99 which are journaled in the lateral wall of the central aperture of a male coupling plate 100 thus secured at the end of the stem or sleeve 95 thereof. It will be understood that this coupling plate 100 can tilt with respect to the stem by virtue of the universal joint formed by the joint block 97, and to render such tilting stiffly resilient I place upon the sleeve 95 a collar 101 having at its lower end a circumferential flange 102 substantially parallel to the coupling plate 100, and arranged between said flange and coupling plate a heavy ring 103 of rubber or other suitably equivalent cushioning means. Beneath the coupling plate 100 is a larger rubber plate 104 which is recessed annularly at its under side as at 105 to receive rings or other shaped pieces of carborundum or other abrasive material 106, 107 cemented in place in any suitable manner. The center of the plate 105 is apertured to receive the hub of the coupling plate, as at 108, and the top of the plate 105 is adapted to fit against the bottom of the coupling plate around said hub, one having notches 109 to receive undercut projections 110 on the other arranged and adapted so that when turned to carry said notches and projections out of registration, the plates will be held together. Suitable means are preferably provided for locking the plates in such turned relation, such as a spring bolt 111 on one of them adapted to enter a recess 112 in the other.

It will be understood that in use the rubber rotates and also slides up and down and furthermore its head tilts with respect to the stem sufficiently to enable it to properly conform to the surface being rubbed, honed or polished. When the carborundum rings or other abrasive members are worn out, the rubber plate 104 is removed and replaced by another one with new abrasive rings. Of course plates with different abrasive materials can be applied for different grades of work and work upon different kinds of stone or the like.

As has been stated, the rubbers and their spindles 63 are arranged in series upon opposite sides of the carriage 8, the individual members of each series alternating with those of the other series in transverse position, or being staggered in plan as shown in Fig. 4, and preferably the distance apart longitudinally of the cross-beam is such that as the carriage is reciprocated the paths of the rubbers on the stone over-lap one another, although it is within the scope of the invention to vary from this as desired. I have shown all the rubbers equidistant from one another, as seen by reference to Figs. 3 and 4, chiefly for convenience in driving them all in the same direction. This driving is done by large gear wheels 113, fast on shafts 114 mounted in upper and lower bearings 115, 116 on the side of the carriage away from the stanchions 5, 6, said shafts 114 being parallel to the spindles 63 and each directly opposite one of said spindles on the other side of the carriage. Each gear wheel 113 thus meshes with three of the spindle gears 64, except one end gear wheel 113 which meshes with only two spindle gears 64 for obvious reasons, see Fig. 3 more especially. The shafts 114 of the end driving gears 113 are extended above the same and carry bevel gears 117 which mesh with other bevel gears 118 on the shaft 47, said gears 118 being suitably splined to the shaft 47 to slide thereon and connected to the carriage 8 by brackets 119 thereon so as to slide therewith. By this arrangement and construction of parts, the rubbers are all driven in the same direction of rotation, although it would be considered within the scope of this invention to drive them otherwise if desired.

In order to lift the rubbers all simultaneously from a stone or the like on which they are working, so as to disengage them therefrom, rocker shafts 120, 120 are arranged side by side beneath the carriage in brackets 121 depending therefrom, so that said shafts lie between the two series of rubber stems 69. Each of said rubber stems is reduced at its lower end and receives a loose collar 122 having at its upper end a flange 123, and upon said collar beneath said flange is a loose ring 124 which at diametrically opposite points has trunnions 125, 125, preferably lying outside said flange 123 in plan. These trunnions are received by interior slots 126 at the inner sides of the arms 127, 127 of a rocking lever 128 fast on one of the shafts 120 as clearly shown in Fig. 18. The series of rubbers at one side of the carriage are thus connected to one of the rocking shafts 120 and the series of rubbers at the other side of the carriage are connected to the other rocking shaft, so that each shaft manipulates one series of rubbers to raise the same.

For rocking said shafts 120 each is provided at one end with an arm 129 projecting downward and adapted at its end to engage a worm transversely mounted in downward extensions 130, 130 of the bracket 121, see Fig. 17. The worm for one of said arms, marked 131, is fast upon a rod 132 which projects to a point convenient to access and carries a hand-wheel 133, while the other worm 134 is upon a sleeve 135 inclosing said rod 132 and also provided with a hand-wheel 136 adjacent the hand-wheel 133. By manipulating said hand-wheels, therefore, the shafts can be rocked to raise or lower the rubbers as desired, and for convenience the worms 131, 134 are provided with threads of the opposite kind, that is one right-hand and the other left-hand, so that by turning the hand-wheels 133, 136 in the same direction the shafts 120, 120 are turned oppositely and the rubbers all affected alike, that is to say, both series raised or both series lowered.

Preferably means of any suitable kind are provided for raising one or more of the rubbers of either series independently of the other in the same series, and I have shown for this purpose U-shaped blocks 182, adapted to be inserted between the flange 123 of each rubber stem and the loose ring 124 beneath said flange and adapted to engage the same to raise the rubber. By raising the rubber to rest said flange above the ring and then inserting one of said blocks 182, obviously that rubber will be held up above the others in idle position. Any other suitable means adapted to accomplish this same purpose of raising one or more of the rubbers of a series independent of the others, could be used without departing from the spirit and scope of my invention.

In order to relieve the piece of marble being rubbed, honed or polished from a portion of the weight of the rubbers, springs 183, 183 are preferably employed at opposite sides of each of the lower bearings 62, for the spindles, said springs having their opposite ends connected to fixed projections 184, 184 on the carrier 8 and their lower ends secured to arms 185, 185 projecting from opposite sides of a band 188 rotatably seated in a circumferential groove 189 of the flange 123 of the collar 122 on the reduced lower end of the stem, see Fig. 19 more especially. By making these springs 183 of suitable tension, obviously the weight or downward pressure of the rubbers would be counteracted to any desired degree. In order to prevent the collar 122 turning with the stem and thus twisting the said springs 183, projections 186, 186 from the ring 124 have vertical slots 187 to receive the arms 185. I have shown these projections 186 as mounted upon the trunnions 125 of the ring 124 between said ring and the arms 127, of the rocking lever 128, but obviously they could be otherwise formed as for instance by making them integral with the ring 124. As shown in Fig. 2 there is a pair of these springs 183 for each rubber, and by means of them any desired pressure of the rubbers by the work beneath them can be secured.

Figure 21:
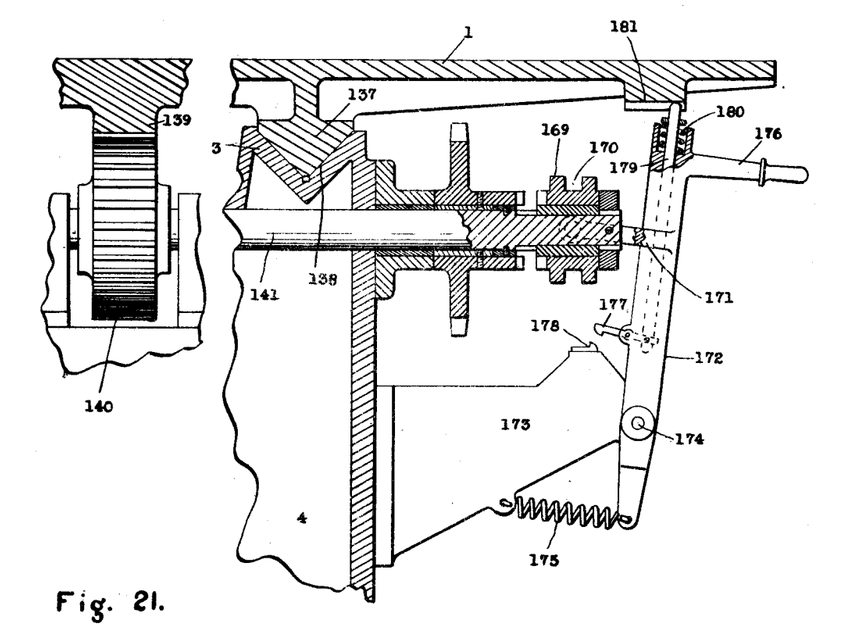
Fig. 21 is a detail sectional view on line J—J of Fig. 1 looking in the direction of the arrows.

The tables 1, 2 I have shown provided at their under sides with ribs 137 adapted to slide in V-shaped grooves 138 of the tracks 3, 3, and for moving said tables each is provided at its under side midway between said ribs with a rack 139 meshing with a pinion 140, see Figs. 2 and 21, upon a shaft 141 projecting transversely of the bed or base 4 at the side of the machine away from the belt pulleys 59. The outer ends of these shafts carry sprocket wheels 142 for the table 1 and 143 for the table 2, said sprocket wheels being out of alinement and connected by chains 144, 145 respectively to driving sprockets 146, 147 upon a shaft 148 mounted between the side of the bed or base and a bracket 149 on the lateral extension 406 of the bed which supports the stanchion 6, as shown in Figs. 1 and 23. Said shaft 148 also carries a worm wheel 150 engaging a worm 151 fast on a shaft 152 which likewise has a bearing in said bracket 149 and extends horizontally along the side of the machine through the lateral extension of the bed and past the same, where it has keyed slidably upon itself between bearings 154, 154 a friction wheel 155. This friction wheel engages peripherally a disk 156 on a shaft 157 extending transversely through the bed or base of the machine and carrying at the opposite side thereof a bevel gear 158 meshing with a second bevel gear 159 on the driving shaft 56, see Figs. 3 and 22. It will be understood therefore that the tables 1 and 2 can be driven or moved by said connections.

Figure 22:
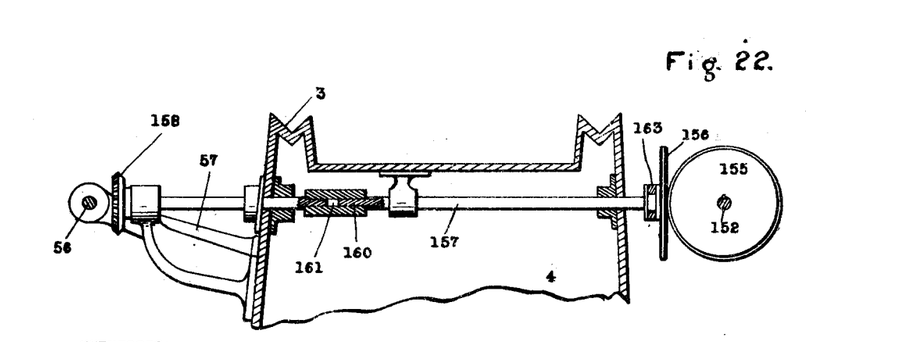
Fig. 22 is a cross-sectional view on line K—K of Fig. 1, looking in the direction indicated by the arrows, and Fig. 23 (Sheet 1) is a detail plan showing the arrangement of certain sprocket chains and related parts for moving the tables.

In order to enable the driving connection to the tables to be thrown out entirely, the shaft 157 is made in sections, one of which has an angular end 160 fitting slidably in a corresponding socket 161 of the other, see Fig. 22, and a bell crank lever 162 connected by a rod 163, horizontal lever 164, connecting rod 165 and vertical controlling lever 166 enables the shaft section carrying the disk 156 to be slid longitudinally to disengage said disk from the friction wheel 155 or engage it therewith. Any other ordinary and well-known means can be used for connecting and disconnecting said shaft sections, however, such as a usual thrust box or the like.

In order to enable the tables to be run in either direction as desired, the friction wheel 155 is adapted to be slid back and forth past the center of the driving disk 156 by means of a connecting rod 167 and hand lever 168, see Fig. 1, or other equivalent means.

In order to enable either table to remain stationary while the other travels, each sprocket wheel 142, 143 is loose on its shaft and suitable clutch means are provided for it independent of the other. These clutches may be of any ordinary and well-known construction adapted to the purpose, although in the drawing I have shown them of a special construction whereby they will be automatically disengaged by the tables. Since they are exactly alike, a description of one will suffice for both and I will describe the one at the right hand end of the machine as shown in Fig. 1, certain details of the construction being more clearly shown in Fig. 21.

The slidable clutch member 169 has in its periphery a groove 170 receiving the projections at the inner sides of the arms of a fork 171 carried by a lever 172 pivoted in upright position upon a bracket 173, as at 174, and normally held with the clutch member thrown out by means of a spring 175 attached to the lower end of the lever. The upper end of the lever has a handle 176 by means of which said lever can be swung manually to throw the clutch in or out. A latch 177 projects from the lever 172 to engage a detent 178, which I have shown on the bracket 173, and hold the lever with the clutch thrown in against the power of the spring 175. The end of this latch 177 away from the detent 178 is pivoted to a push rod 179 which extends longitudinally of the lever 172 and slidably with respect thereto upward to the upper end of the lever, from which it is normally held projected by a spring 180. The latch 177 will thus lock the lever when thrown in, and in order to swing the lever outward it is necessary for the operator to release the latch which he may do manually. For automatically depressing said push rod 179 and thus releasing the clutch and stopping the table, I provide upon the tables at any desired point an inclined or cam surface 181 to engage the end of the push rod as the table comes into desired position. This does not interfere with manual operation of the clutch lever, and precludes any possibility of forgetfulness on the part of the operator.

Having thus described the invention what I claim is,—

1. In a machine of the character described, the combination with a work support, of a cross-beam above said support providing tracks at its upper and lower edges, a sleeve-like carriage comprising longitudinal sections adapted to inclose said cross-beam and slidably engage said tracks, rubbers carried by said carriage, and means for rotating said rubbers and reciprocating said carriage.

2. In a machine of the character described, the combination with a work support, of a cross-beam above said support providing projecting tracks at its upper and lower edges, a sleeve-like carriage comprising longitudinal sections adapted to inclose said cross-beam and slidably receive between themselves the said tracks thereon, rubbers carried by said carriage, and means for rotating said rubbers and reciprocating said carriage.

3. In a machine of the character described, the combination with a work support, of a cross-beam above said support providing projecting tracks at its upper and lower edges, a carriage comprising sections adapted to receive said tracks between themselves so as to slide thereon, shoes on one of said sections adjustable toward and away from the side of the track from outside the carriage, rubbers carried by said carriage, and means for rotating said rubbers and reciprocating said carriage.

4. In a machine of the character described, the combination with a work support, of a hollow cross-beam above said support and having a longitudinal slot, a sleeve-like carriage comprising longitudinal sections adapted to slidably inclose said cross-beam, a reciprocating member inside said cross-beam, means connecting said reciprocating member to said carriage through the said slot in the cross-beam, means for actuating said reciprocating member, rubbers on said carriage, and means for rotating said rubbers.

5. In a machine of the character described, the combination with a work support, of a hollow cross-beam above said support having enlarged ends and a laterally contracted middle portion, a sleeve-like carriage on said contracted middle portion of the cross-beam having a pin extending through a slot therein, crank means mounted in one enlarged end of the cross-beam, a connecting rod extending from said crank means to said pin, rubbers on said carriage, and means for rotating said rubbers and crank means.

6. In a machine of the character described, the combination of a vertically adjustable horizontal cross-beam, a slidable carriage on said cross-beam, rubbers mounted on opposite sides of said carriage in staggered relation and having gear wheels at the upper ends of their spindles, large gear wheels mounted on said carriage in the plane of said spindle gears and each engaging three of said spindle gears, and means for driving one or more of said large gear wheels.

7. In a machine of the character described, the combination of a vertically adjustable horizontal cross-beam, a slidable carriage on said cross-beam, rubbers mounted on the opposite upright sides of said carriage in staggered relation to each other and having gear wheels at the upper ends of their spindles, large gear wheels mounted on said carriage in the plane of said spindle gears each engaging three of said spindle gears, a shaft mounted longitudinally of said cross-beam on the top thereof, bevel gears on said shaft and large gear wheel shafts, means connecting the bevel gears on said shaft to the carriage, and means for rotating said shaft.

8. In a machine of the character described, the combination of a horizontal hollow cross-beam having longitudinal slots in its opposite walls near its middle, a sleeve-like carriage comprising longitudinal sections slidably inclosing said cross-beam, a wrist pin on said carriage extending through said slots of the cross-beam, rubbers mounted on the opposite upright sides of the carriage, a substantially horizontal driving shaft above said carriage, means for transmitting motion from said shaft to said rubbers, a crank at one end of the cross-beam, means for transmitting motion from said driving shaft to said crank, a connecting rod extending from said crank through the hollow cross-beam to said wrist pin, and means for driving said driving shaft.

9. In a machine of the character described, the combination of a hollow cross-beam, a carriage slidable on said cross-beam and having a pin extending through a slot therein, rubbers mounted on the opposite upright sides of said carriage, a driving shaft mounted on the cross-beam above said carriage, means for transmitting motion from said shaft to said rubbers, a worm wheel on one end of said cross-beam driven from said driving shaft, a crank in one end of the cross-beam, means for transmitting motion from the worm wheel shaft to the crank shaft, and a connecting rod extending from said crank to said pin of the carriage.

10. In a machine of the character described, the combination with a horizontal carriage, of rubbers mounted on the upright sides thereof, and means for resiliently supporting each rubber against gravity.

11. In a machine of the character described, the combination with a horizontal carriage, of rubbers mounted on the upright sides of said carriage, and a spring partially supporting the weight of each rubber.

12. In a machine of the character described, the combination with a horizontal carriage, of rubbers mounted on the upright sides of said carriage, springs arranged longitudinally on opposite sides of each of said rubbers, and means connecting said springs to said rubber so as to counteract the weight thereof without preventing its rotation.

13. In a machine of the character described, the combination with a substantially horizontal carriage, of a rubber mounted vertically in said carriage and having a depending stem with a shoulder thereon, a collar beneath said shoulder, arms projecting radially from said collar, springs attached at one end to said arms and at their other end to a higher fixed part of the machine, and means for rotating said rubber.

14. In a machine of the character described, the combination with a traveling work support, of a cross-beam above said support, a sleeve-like carriage on said cross-beam having a pin extending through a slot therein, a connecting rod inside the cross-beam engaging said pin to reciprocate the carriage, rubbers depending from said carriage at the side thereof, and means for rotating said rubbers and driving said connecting rod.

15. In a machine of the character described, the combination with a horizontally disposed carriage, of a rubber mounted vertically in said carriage and having a depending stem with a shoulder thereon, a collar beneath said shoulder, a band rotatably loose and longitudinally fast on said collar, springs attached at one end to said band and at their other end to a higher fixed part of the machine, a ring beneath said collar rotatably loose with respect thereto, means for holding said ring against rotation and for lifting the same, and means for securing said band to said ring against rotation while allowing independent movement longitudinally of the stem.

16. In a machine of the character described, the combination with a horizontally disposed carriage, of a rubber mounted vertically in said carriage and having a depending stem with a shoulder thereon, a collar beneath said shoulder, a band rotatably loose and longitudinally fast on said collar and having opposite radial arms, springs attached each at one end to one of said arms and at its other end to an upper fixed part of the machine, means for lifting said collar without interfering with its rotation or with its upward movement independent of said lifting means, and means for preventing rotation of said band with respect to said lifting means while permitting independent movement longitudinally of the stem.

17. In a machine of the character described, the combination with a cross-beam of a reciprocating carriage on said cross-beam having at its upright side a pair of upper and lower bearings, a spindle mounted in said bearings, a rubber having a stem rotatably fast and longitudinally loose in said spindle, means for resiliently supporting a portion of the weight of said rubber, and means for rotating said spindle.

18. In a machine of the character described, the combination with a cross-beam, of a reciprocating carriage on said cross-beam having upper and lower bearings, a spindle mounted in said bearings, a rubber having a stem rotatably fast and longitudinally loose in said spindle, a collar on said stem, springs extending from said collar to the carriage, and means for rotating said spindle.

19. In a machine of the character described, the combination of a carriage, a series of spindles mounted in upright position on said carriage, a rubber depending from each spindle rotatably fast and longitudinally loose with respect thereto, means for resiliently supporting a portion of the weight of each rubber, means below said resiliently supporting means for raising and lowering each rubber while permitting independent upward movement of it, and means for rotating said spindles.

20. In a machine of the character described, the combination of a carriage, a series of spindles mounted in upright position on said carriage, a rubber having a stem rotatably fast and longitudinally loose in each spindle, a trunnion ring rotatably loose on each stem and engaging an upper shoulder or stop thereon, a rocker shaft with arms engaging each one of said trunnion rings, means for rocking said shaft, and means for rotating said spindles.

21. In a machine of the character described, the combination with a cross-beam, of a carriage longitudinally slidable on said cross-beam, series of spindles mounted on opposite sides of said carriage, rubbers having their stems rotatably fast and longitudinally loose in said spindles, trunnion rings rotatably loose on said stems and adapted to raise the same with themselves, rocker shafts beneath the carriage and between said series of rubbers, arms on said rocker shafts those of one shaft engaging one series of trunnion rings and those on the other shaft engaging the other series of trunnion rings, means for rocking said shafts in opposite directions to either raise or lower all the rubbers simultaneously, and means for rotating said spindles.

22. In a machine of the character described, the combination with a carriage having upper and lower bearings, of a hollow spindle rotatably supported against longitudinal movement in said bearings and having oil passages therein, a rubber having a stem slidably mounted in said spindle and provided with exterior oil grooves, said stem being tubular, means for supplying water to the upper end of said stem, means for supplying oil to said bearings, and means for rotating said spindle.

23. In a machine of the character described, the combination with a carriage having a bearing, of a hollow spindle rotatably mounted in said bearing and having oil passages therein, a rubber having a tubular stem slidably keyed in said spindle and provided with exterior oil grooves, a water supply tube leading into the upper end of said stem, means for supplying oil to the bearing, and means for rotating said spindle.

24. In a machine of the character described, a base providing a track, a plurality of tables adapted to travel on said track, means for driving said tables in the same direction from the same source of power, means for disconnecting either of said tables from said driving means, and means for reversing said driving means.

25. In a machine of the character described, a base providing a track, a plurality of tables adapted to travel on said track, a carriage adapted to move transversely of said track above the same, a series of rotary rubbers depending from said carriage and adapted to engage work on said tables, a driving shaft, means for transmitting motion from said shaft to rotate said rubbers and to reciprocate said carriage, means for transmitting motion from said shaft to drive said tables along said track, means for disconnecting either of said tables from said driving means, and means for reversing said table driving means.

26. In a machine of the character described, a base providing a track, a table adapted to travel on said track, means for driving said table, means for reversing the direction of travel of the table, and a clutch adapted to automatically disconnect the table driving means when the table reaches a predetermined position.

27. In a machine of the character described, a base providing a track, a table adapted to travel on said track and having a rack, a pinion mounted on the base and adapted to engage said rack, a wheel loose with respect to said pinion, means for rotating said wheel in either direction, a clutch adapted to cause said wheel and pinion to turn together, a clutch lever adapted to throw out said clutch automatically, means for holding said lever in position with the clutch thrown in, and means adapted to be engaged by the table for releasing said holding means.

28. In a machine of the character described, the combination of a carriage, a series of spindles mounted in upright position on said carriage, a rubber having a stem rotatably fast and longitudinally loose in each spindle and having a stop or shoulder, a rocker shaft with arms adapted to lift the stems by said shoulders, means for rocking said shaft, and means for rotating said spindles.

29. In a machine of the character described, the combination of a carriage, a parallel series of spindles mounted in upright position one on each side of said carriage, rubbers each having a stem rotatably fast and longitudinally loose in one of said spindles and having a shoulder or stop, rocker shafts beneath said carriage between said series of spindles, arms on said rocker shafts arranged and adapted to lift the stems by said shoulders, means for rocking said shafts, and means for rotating said spindles.

30. In a machine of the character described, the combination of a carriage, a series of spindles mounted in upright position on one longitudinal side of said carriage, rubbers each having a stem rotatably fast and longitudinally loose in one of said spindles and having a shoulder or stop, a rocker shaft beneath said carriage, arms on said rocker shaft arranged and adapted to lift the rubbers by said shoulders on their stems, means for rocking said shafts, and means for rotating said spindles.

31. In a machine of the character described, the combination with a carriage having upper and lower bearings on its side, spindles mounted in said bearings, a gear fast on each of said spindles above said bearing and adapted to prevent downward movement of the spindle, rubbers each having a stem rotatably fast and longitudinally loose in one of said spindles, and means for driving said gears.

32. In a machine of the character described, the combination with a carriage having bearings, spindles one mounted in each of said bearings, a gear fast on each spindle above its bearings and engaging the cap thereof to prevent downward movement of the spindles, rubbers each having a stem rotatably fast and longitudinally loose in one of said spindles, means for raising said stems in said spindles, and means for driving said gears.

33. In a machine of the character described, the combination of a hollow spindle, a rubber having a hollow stem mounted in said spindle, means for rotating said spindle and stem, and a tube carried by the spindle and extending down through said spindle into the stem and adapted to supply fluid to the rubber.

34. In a machine of the character described, the combination of a hollow spindle, a rubber having a hollow stem mounted in said spindle, means for rotating said spindle and stem, and a tube mounted in the top of said spindle to rotate therewith and extending down into the stem in slidable relation thereto.

35. In a machine of the character described, the combination of a hollow spindle, a funnel in the top of said spindle, a rubber having a hollow stem extending upward into said spindle from beneath rotatably fast and longitudinally loose with respect thereto, a tube extending from said funnel down into said stem and being loose therein, and means for rotating said spindle.

36. In a machine of the character described, a base providing a track, a table on said track, a rack on said table, a pinion engaging said rack, a driving shaft, mechanism adapted to transmit motion from said shaft to said pinion and including a friction wheel and disk, and means for moving said friction wheel and disk each along a diametric line of the other.

37. In a machine of the character described, a base providing a track, a table on said track, a rack on said table, a pinion engaging said rack, a driving shaft, mechanism adapted to transmit motion from said shaft to said pinion and including a friction wheel and disk, means for moving the friction wheel diametrically of the disk past its center, and means for discontinuing the transmission of motion between said shaft and pinion.

38. In a machine of the character described, a base providing a track, a table on said track, a rack on said table, a pinion engaging said rack, a driving shaft, mechanism adapted to transmit motion from said shaft to said pinion and including a friction wheel and disk, and means for moving the friction wheel diametrically of the disk past its center.

39. In a machine of the character described, a track, a work supporting table on said track, mechanism adapted to move said table longitudinally and including a friction wheel and disk, means for moving the friction wheel diametrically of the disk to change the direction of movement of the table, and means for moving the disk out of engagement with the friction wheel to stop the table.

40. In a machine of the character described, a track, a table adapted to travel on said track, mechanism for driving said table and including a clutch, a clutch lever means normally throwing out the clutch, and locking means for holding said lever with the clutch thrown in adapted to be released by engagement with the table in a predetermined position.

41. In a machine of the character described, a track, a table adapted to travel on said track, mechanism for driving said table and including a clutch, a clutch lever, a spring holding said clutch lever with the clutch thrown out, a latch for holding the lever with the clutch thrown in, and means for causing the table to automatically release said latch when it reaches a predetermined position.

42. In a machine of the character described, a track, a table adapted to travel on said track, a clutch lever, a spring holding said clutch lever with the clutch thrown out, a latch for holding the lever with the clutch thrown in, and a spring-controlled push-rod on the lever connected to said latch adapted to be engaged by the table in a predetermined position and operated to release said latch.

CHARLES A. GRICE.

Witnesses:
 HOWARD P. KING,
 JANET A. AYERS.